United States Patent
Biswas et al.

(10) Patent No.: US 11,800,335 B2
(45) Date of Patent: Oct. 24, 2023

(54) PREDICTIVE SCALING OF APPLICATION BASED ON TRAFFIC AT ANOTHER APPLICATION

(71) Applicant: VMware, Inc., Palo Alto, CA (US)

(72) Inventors: Sudipta Biswas, Bangalore (IN);
Monotosh Das, Bangalore (IN);
Hemant Kumar Shaw, Bangalore (IN);
Shubham Chauhan, Faridabad (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/729,774

(22) Filed: Apr. 26, 2022

(65) Prior Publication Data
US 2023/0231933 A1    Jul. 20, 2023

(30) Foreign Application Priority Data

Jan. 19, 2022 (IN) ............................. 202241003041
Jan. 19, 2022 (IN) ............................. 202241003045

(51) Int. Cl.
*H04L 67/60*    (2022.01)
*H04L 47/125*    (2022.01)
*H04L 47/70*    (2022.01)

(52) U.S. Cl.
CPC ............ *H04L 67/60* (2022.05); *H04L 47/125* (2013.01); *H04L 47/82* (2013.01)

(58) Field of Classification Search
CPC .... H04W 4/50; H04W 28/0289; H04L 41/40; H04L 67/60; H04L 47/125; H04L 47/82
See application file for complete search history.

(56) References Cited

U.S. PATENT DOCUMENTS

| | | |
|---|---|---|
| RE4,814 E | 3/1872 | Madurell |
| 8,499,066 B1 * | 7/2013 | Zhang ................. G06F 9/06 709/200 |
| 8,856,797 B1 | 10/2014 | Siddiqui et al. |
| 9,032,078 B2 | 5/2015 | Beerse et al. |
| 9,256,452 B1 | 2/2016 | Suryanarayanan et al. |
| 9,288,193 B1 | 3/2016 | Gryb et al. |
| 9,300,552 B2 | 3/2016 | Dube et al. |
| 9,300,553 B2 | 3/2016 | Dube et al. |
| 9,319,343 B2 | 4/2016 | Khandelwal et al. |

(Continued)

FOREIGN PATENT DOCUMENTS

WO    WO-2018162970 A1 *   9/2018 ......... H04L 41/0806

OTHER PUBLICATIONS

Nguyen et al., "Load-Balancing of Kubernetes-Based Edge Computing Infrastructure Using Resource Adaptive Proxy," Sensors 2022, 22, 2869. https://doi.org/10.3390/s22082869 (Year: 2022).*

(Continued)

*Primary Examiner* — Alina A Boutah
(74) *Attorney, Agent, or Firm* — ADELI LLP

(57) ABSTRACT

Some embodiments provide a method that identifies a first number of requests received at a first application. Based on the first number of requests received at the first application, the method determines that a second application that processes requests after processing by the first application requires additional resources to handle a second number of requests that will be received at the second application. The method increases the amount of resources available to the second application prior to the second application receiving the second number of requests.

20 Claims, 12 Drawing Sheets

(56) References Cited

U.S. PATENT DOCUMENTS

| | | |
|---|---|---|
| 9,329,915 B1 | 5/2016 | Chandrasekharapuram et al. |
| 9,459,980 B1 | 10/2016 | Arguelles |
| 9,558,465 B1 | 1/2017 | Arguelles et al. |
| 9,613,120 B1 | 4/2017 | Kharatishvili et al. |
| 9,674,302 B1 | 6/2017 | Khalid et al. |
| 9,817,699 B2 | 11/2017 | Stich et al. |
| 9,935,829 B1 | 4/2018 | Miller et al. |
| 9,959,188 B1 | 5/2018 | Krishnan |
| 9,979,617 B1 | 5/2018 | Meyer et al. |
| 10,003,550 B1 | 6/2018 | Babcock et al. |
| 10,237,135 B1 | 3/2019 | Alabsi et al. |
| 10,594,562 B1 | 3/2020 | Rastogi et al. |
| 10,873,541 B2 | 12/2020 | Callau et al. |
| 11,411,825 B2 | 8/2022 | Rastogi et al. |
| 2005/0120160 A1 | 6/2005 | Plouffe et al. |
| 2012/0131591 A1 | 5/2012 | Moorthi et al. |
| 2012/0254443 A1 | 10/2012 | Ueda |
| 2012/0254444 A1* | 10/2012 | Harchol-Balter ......... G06F 9/06 709/226 |
| 2013/0086273 A1 | 4/2013 | Wray et al. |
| 2013/0179289 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0290538 A1 | 10/2013 | Gmach et al. |
| 2014/0059179 A1* | 2/2014 | Lam .................... G06F 11/3442 709/219 |
| 2014/0215621 A1 | 7/2014 | Xaypanya et al. |
| 2014/0304414 A1 | 10/2014 | Yengalasetti et al. |
| 2014/0344439 A1 | 11/2014 | Kempf et al. |
| 2015/0058265 A1 | 2/2015 | Padala et al. |
| 2015/0074679 A1 | 3/2015 | Fenoglio et al. |
| 2015/0134831 A1 | 5/2015 | Hiroishi |
| 2015/0199219 A1 | 7/2015 | Kim et al. |
| 2015/0278061 A1 | 10/2015 | Siciliano et al. |
| 2016/0064277 A1 | 3/2016 | Park et al. |
| 2016/0094401 A1* | 3/2016 | Anwar ................. G06F 11/3006 709/223 |
| 2016/0094410 A1 | 3/2016 | Anwar et al. |
| 2016/0094483 A1 | 3/2016 | Johnston et al. |
| 2016/0103717 A1 | 4/2016 | Dettori et al. |
| 2016/0127204 A1 | 5/2016 | Ozaki et al. |
| 2016/0164738 A1 | 6/2016 | Pinski et al. |
| 2016/0294722 A1 | 10/2016 | Bhatia et al. |
| 2016/0323197 A1* | 11/2016 | Guzman ................ G06F 9/5083 |
| 2016/0323377 A1 | 11/2016 | Einkauf et al. |
| 2016/0359719 A1 | 12/2016 | Travostino |
| 2016/0378635 A1 | 12/2016 | Taylor et al. |
| 2017/0126792 A1* | 5/2017 | Halpern .............. H04L 67/1001 |
| 2017/0331907 A1 | 11/2017 | Jagannath et al. |
| 2017/0344618 A1 | 11/2017 | Horowitz et al. |
| 2018/0018244 A1 | 1/2018 | Yoshimura et al. |
| 2018/0046482 A1 | 2/2018 | Karve et al. |
| 2019/0121672 A1 | 4/2019 | Ding et al. |
| 2019/0347134 A1* | 11/2019 | Zhuo ........................ G06N 5/00 |
| 2020/0014594 A1 | 1/2020 | Lapiotis et al. |
| 2020/0287794 A1 | 9/2020 | Rastogi et al. |
| 2020/0314173 A1* | 10/2020 | Pahwa .................. G06F 9/5083 |
| 2021/0126871 A1* | 4/2021 | Bonas ..................... H04L 67/56 |
| 2021/0144517 A1 | 5/2021 | Bernat et al. |
| 2021/0349749 A1 | 11/2021 | Guha |
| 2022/0261164 A1* | 8/2022 | Zhuravlev ............. G06F 3/0638 |
| 2022/0261286 A1* | 8/2022 | Wang .................... G06F 3/0611 |
| 2022/0300345 A1* | 9/2022 | Reijonen ............... G06F 9/5022 |
| 2022/0318060 A1* | 10/2022 | Choochotkaew ..... G06F 9/5077 |
| 2022/0357995 A1* | 11/2022 | Moussaoui ........... G06F 9/5033 |
| 2022/0398187 A1* | 12/2022 | Balasubramanian ........................ G06F 11/3495 |
| 2023/0028837 A1* | 1/2023 | Wang .................. H04L 41/0816 |
| 2023/0028922 A1* | 1/2023 | Wang ..................... H04L 45/58 |
| 2023/0073891 A1* | 3/2023 | Wang ...................... H04L 41/40 |
| 2023/0155958 A1* | 5/2023 | An ........................ H04L 47/783 709/226 |

OTHER PUBLICATIONS

Non-Published Commonly Owned Related International Patent Application PCT/US22/39025 with similar specification, filed Aug. 1, 2022, 42 pages, VMware, Inc.

PCT International Search Report and Written Opinion of Commonly Owned International Patent Application PCT/US2022/039025, dated Oct. 18, 2022, 16 pages, International Searching Authority (EPO).

Non-Published Commonly Owned Related U.S. Appl. No. 17/729,776 with similar specification, filed Apr. 26, 2022, 42 pages, VMware, Inc.

* cited by examiner

| Service | Flow Paths | Scaling Factor Computation |
|---------|------------|----------------------------|
| A | Ingress | 1x |
| B | A—>B | 0.7x |
| C | A—>B—>C or A—>B—>E—>C | 0.7*(0.5+(0.8*0.5))x = 0.63x |
| D | (A—>C)—>D | 0.63*0.3x = 0.189x |
| E | A—>B—>E | 0.7*0.8x=0.56x |

*Figure 5*

| Time | 9:00 | 9:12 | 9:24 | 9:36 | 9:48 | 10:00 | 10:12 | 10:24 | 10:36 | 10:48 | 11:00 |
|------|------|------|------|------|------|-------|-------|-------|-------|-------|-------|
| Flow Data | 100 | 110 | 120 | 90 | 120 | 60 | 70 | 50 | 70 | 60 | 80 |

*Figure 6*

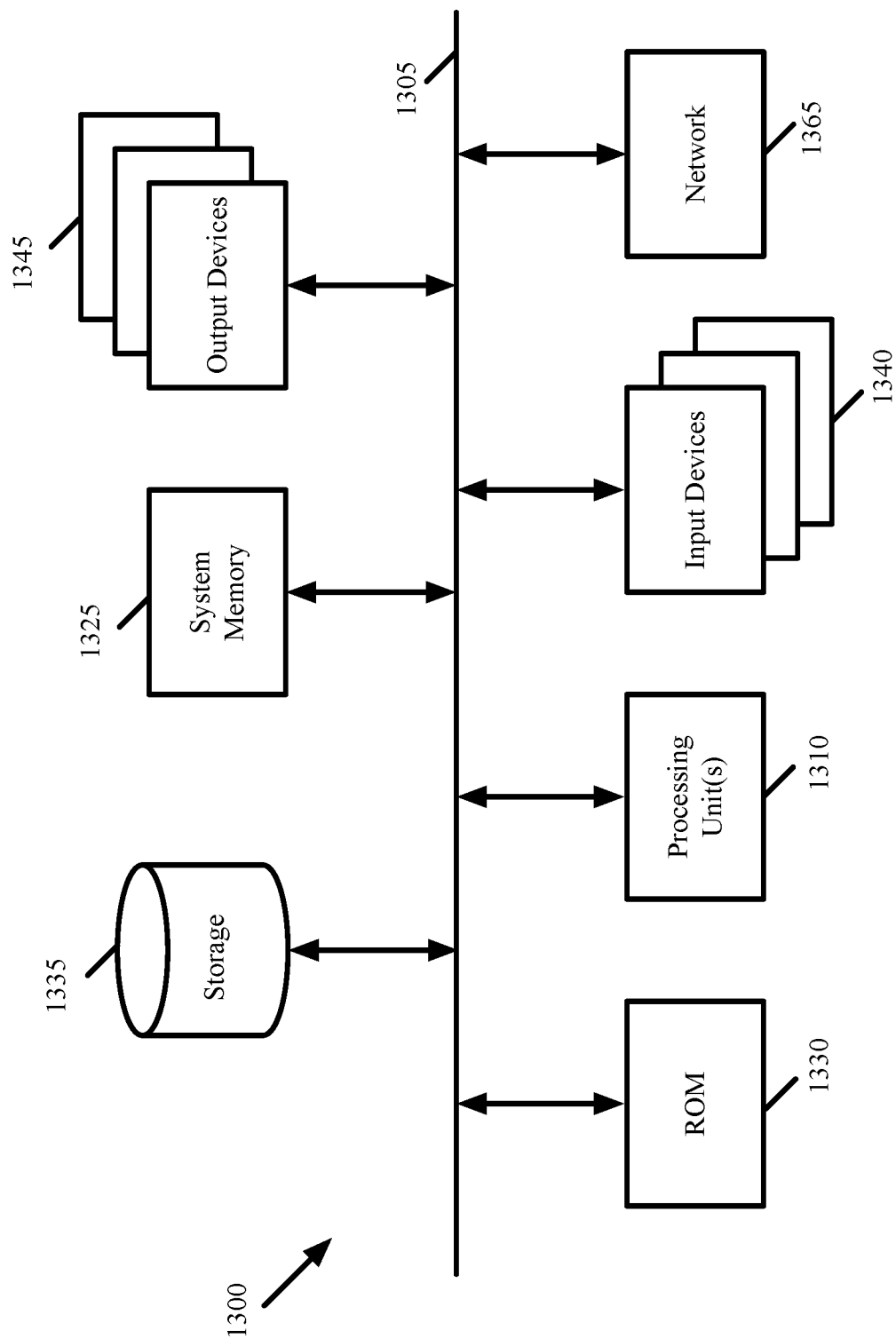

PREDICTIVE SCALING OF APPLICATION BASED ON TRAFFIC AT ANOTHER APPLICATION

BACKGROUND

The increase in traffic diversity and accelerated capacity demand in mobile networks have pushed design of innovative architectural solutions and cost-effective paradigms for 5G evolution. Network Functions Virtualization (NFV) is an emerging trend in networking that involves migration of network functions (NFs) into virtualized environments, which leads to reduced capital investment. Traditionally, NFs are embedded on dedicated hardware devices (middleboxes or network appliances), but service providers and operators decouple NFs from their underlying hardware and run them on commodity servers. This has given birth to NFV technology that converts NFs into virtualized network functions (VNFs) hosted in virtual machines or containers. Network policies often require these VNFs to be stitched together as service chains to deliver various services or network functionality. These service chains define a sequence of services (network functions) through which traffic is steered.

Microservices allow parts of applications (or different services in a service chain) to react independently to user input. Kubernetes is considered as the most popular microservices orchestration. Within Kubernetes, auto-scaling is a mechanism by which applications can be scaled in or scaled out based on triggers. These triggers are typically based on observing an individual service and scaling that service as necessary. However, these reactive measures can cause issues for latency-sensitive workloads such as those implemented in a 5G service chain. As such, better techniques for auto-scaling such workloads would be useful.

BRIEF SUMMARY

Some embodiments provide a method for pre-emptively scaling resources allocated to one application based on identifying an amount of traffic received at another, related application. The method identifies a first number of requests received at a first application and, based on this first number of requests, determines that a second application that processes at least a subset of the requests after processing by the first application requires additional resources to handle a second number of requests that will be received at the second application. The method increases the number of resources available to the second application prior to the second application receiving this second number of requests, in order to avoid processing delays and/or dropped requests at the second application.

In some embodiments, the first and second applications are services in a service chain (e.g., for a 5G or other telecommunications network) that includes at least two services applied to the requests (e.g., audio and/or video calls). For each respective service in the service chain, the method uses a respective scaling factor that estimates a percentage of the requests received at the first service that will subsequently be received at the respective service in order to deploy additional resources to the respective service.

The services of the service chain, in some embodiments, are implemented as virtualized network functions. For instance, some embodiments deploy each service as one or more Pods in a Kubernetes cluster for the service chain. Each Pod is allocated a particular amount of resources (e.g., memory and processing capability) that enable the Pod to perform its respective service on a particular number of requests in a given time period (e.g., requests/second). In this environment, a front-end load balancer is configured to receive the requests and measure the number of requests received in real-time or near-real-time. Specifically, a data plane component of the load balancer receives and load balances the traffic at least among instances of the first service in the service chain in addition to providing information about the processed traffic to a control plane component of the load balancer. The control plane component uses this traffic information to measure the number of requests and provide that information to a scaler module that also operates (e.g., as a Pod or set of Pods) in the Kubernetes cluster.

The scaler module, in some embodiments, (i) computes the scaling factors for each service in the service chain and (ii) handles auto-scaling the services based on these scaling factors, traffic measurements from the load balancer (e.g., a number of requests forwarded by the load balancer to the first service), and data indicating the processing capabilities of each Pod for each service (enabling a judgment as to when the number of Pods should be increased or decreased for a given service). The scaler module computes the scaling factors either once at initial setup of the cluster or on a regular basis (e.g., depending on whether the inputs to the scaling factors use predefined or real-world data).

To compute the scaling factors, the scaler module of some embodiments generates a graph (e.g., a directed acyclic graph) of the service chain. In this graph, each service is represented as a node and each direct path from one service to another is represented as an edge. Each edge from a first node to a second node has an associated coefficient that specifies an estimate of the percentage of requests received at the service represented by the first node that are forwarded to the service represented by the second node (as opposed to being dropped, blocked, or forwarded to a different service). These coefficients may be specified by a user (e.g., a network administrator) or based on real-world measurement of the number of requests received at each of the services (e.g., over a given time period).

For each service, the scaler module uses the graph to identify each path through the service chain from the first service in the service chain to that service. For each such path, the scaler module multiplies each coefficient along the path in order to compute a factor for the path. The scaling factor for a given service is then the sum of the computed factors for each of the paths from the first service to that service, representing the estimated percentage of the requests received by the first service that will need to be processed by that service (the scaling factor for the first service will be 1). Other embodiments use a different equivalent computation that performs the component calculations in a different order in order to reduce the number of multiplications.

In real-time, as the load balancer provides measurements to the scaler module, the scaler module determines whether each of the services needs to be scaled (e.g., whether additional Pods should be instantiated for each service). Specifically, for one or more metrics (e.g., total requests, requests per second, latency (which is correlated with the rate of incoming traffic), etc.), the capacity of each Pod is specified for each service. A current value for each metric (based on the metrics from the load balancer and the scaling factor for the service) is divided by the Pod capacity for a given service to determine the number of Pods that will be required for the service. If the actual number of Pods is less than the required number of Pods, then the scaler module manages the deployment of additional Pods for the service. In this manner, if a large increase in traffic is detected at the load balancer, all of the services can be scaled up to meet this demand prior to the receipt of all of those requests at the services.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 5 illustrates a table showing scaling factor computations for each of the services shown in the graph of FIG. 4.

FIG. 6 illustrates a table providing an example of flow data over a time period for a particular path between two applications.

FIG. 13 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for pre-emptively scaling resources allocated to one application based on identifying an amount of traffic received at another, related application. The method identifies a first number of requests received at a first application and, based on this first number of requests, determines that a second application (which processes at least a subset of the requests after processing by the first application) requires additional resources to handle a second number of requests that will be received at the second application. The method increases the number of resources available to the second application prior to the second application receiving this second number of requests, in order to avoid processing delays and/or dropped requests at the second application.

In some embodiments, the first and second applications are services in a service chain (e.g., for a 5G or other telecommunications network) that includes at least two services applied to the requests (e.g., audio and/or video calls). For each respective service in the service chain, the method uses a respective scaling factor that estimates a percentage of the requests received at the first service that will subsequently be received at the respective service in order to deploy additional resources to the respective service.

Figure 1:
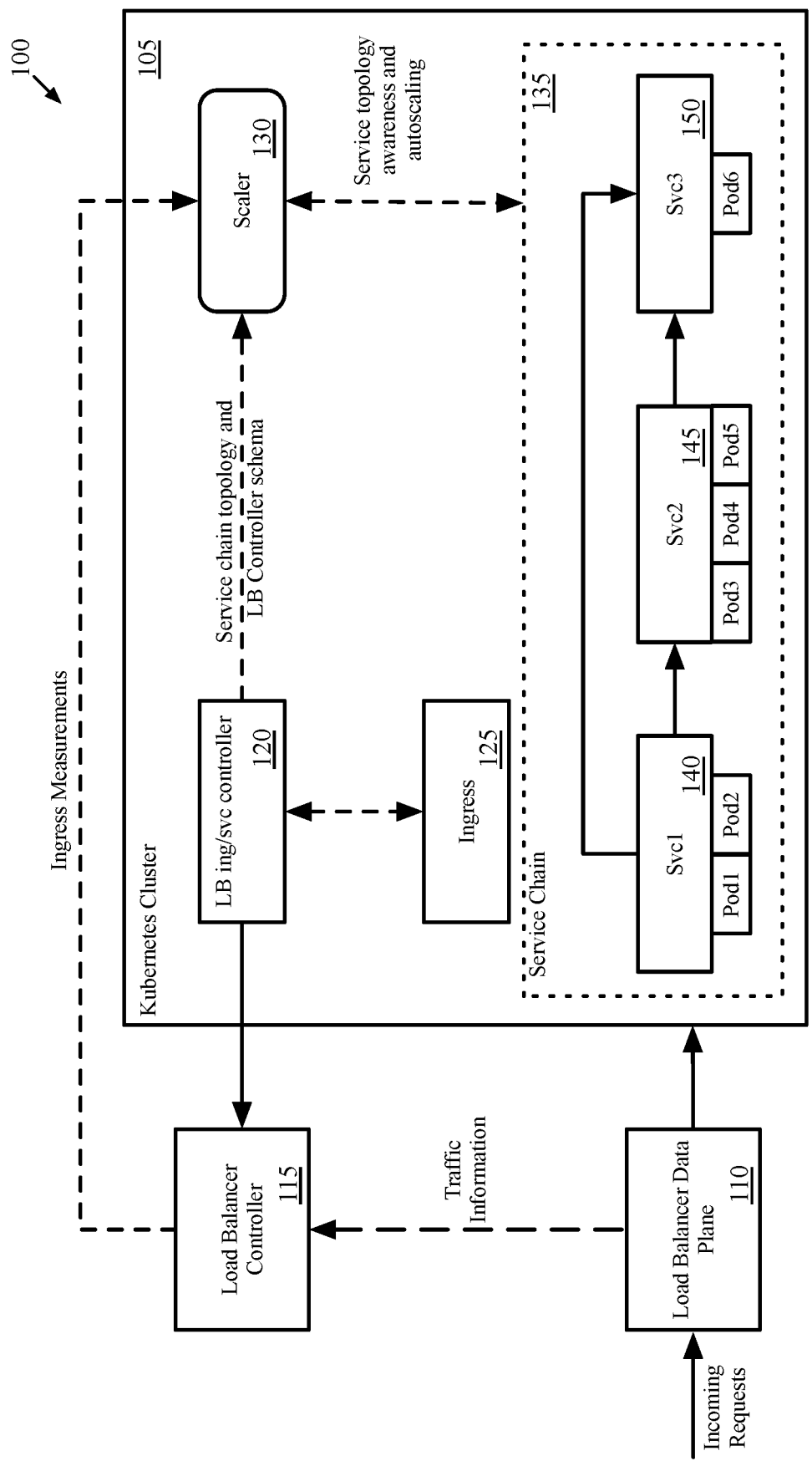
FIG. 1 conceptually illustrates the architecture of a service chain deployment of some embodiments.

The services of the service chain, in some embodiments, are implemented as virtualized network functions. For instance, some embodiments deploy each service as one or more Pods in a Kubernetes cluster for the service chain. FIG. 1 conceptually illustrates the architecture of such a service chain deployment 100 of some embodiments. As shown, the deployment 100 includes a Kubernetes cluster 105 as well as a front-end load balancer. The Kubernetes cluster 105 includes an ingress controller 120 for the load balancer, a Kubernetes ingress object 125, a scaler module 130, and the service chain 135 (which, as described below, includes multiple services).

The front-end load balancer, in some embodiments, includes both a data plane 110 and a controller 115. In some embodiments, front-end load balancers such as Avi Vantage can be configured to define virtual services as a front-end for Kubernetes-based applications, generally via ingress controllers. Each virtual service maps to back-end server pools, serviced by application pods in the Kubernetes cluster. In some embodiments, these virtual services are the ingress point for incoming traffic when used at the edge of the cluster, as in the deployment 100. That is, all traffic sent to the cluster passes initially through the front-end load balancer. In the example of a 5G or other telecommunication network, this traffic may include audio and/or video calls, potentially in addition to other types of traffic.

In some embodiments, an initial data message or set of data messages for a call (which can be referred to as a request) is sent to the service chain via the front-end load balancer (e.g., for the service chain to perform authentication and other tasks for the call), while subsequent traffic (carrying audio and/or video data) does not need to be processed through the service chain. In other embodiments, all traffic for the network passes through the front-end load balancer and service chain.

In some embodiments, the load balancer data plane 110 receives the incoming requests and load balances this ingressing traffic (possibly in addition to providing additional services, such as web application firewall). The load balancer data plane 110 may be implemented by a single appliance, a centralized cluster of appliances or virtualized data compute nodes (e.g., bare metal computers, virtual machines, containers, etc.), or a distributed set of appliances or virtualized data compute nodes. In some embodiments, the load balancer data plane 110 may load balance traffic between different Pods implementing the first service in the service chain and then forward the traffic to the selected Pods. In other embodiments, the load balancer data plane 110 performs additional service chaining features, such as defining a path through the service chain for an incoming data message (e.g., by selecting Pods for each of the services and embedding this selection in a header of that data message). In addition, while forwarding the incoming requests to the service chain 135 in the cluster 105, the load balancer data plane 110 gathers information about the incoming requests and provides this traffic information to the load balancer controller 115.

The load balancer controller 115 is a centralized control plane that manages one or more instances of the load balancer data plane 110. The load balancer controller 115 defines traffic rules (e.g., based on administrator input) and configures the data plane 110 to enforce these traffic rules. In addition, the controller 115 gathers various traffic metrics from the data plane 110 (and aggregates these metrics in the case of a distributed data plane). The controller 115 also makes these aggregated metrics accessible (e.g., to an administrator, the scaler module 130, etc.). In some embodiments, the metrics are accessible (to administrators, other modules, etc.) via application programming interfaces (APIs) such as representational state transfer (REST) APIs.

The ingress controller 120 for the load balancer, in some embodiments, handles conversion of data between the Kubernetes cluster and the front-end load balancer. In some embodiments, the ingress controller 120 is implemented on one or more Pods in the Kubernetes cluster 105. This ingress controller 120 listens to a Kubernetes API server and translates Kubernetes data (e.g., the ingress object 125, service objects, etc.) into the data model used by the front-end load balancer. The ingress controller 120 communicates the translated information to the load balancer controller 115 via API calls in some embodiments to automate the implementation of this configuration by the load balancer data plane 110.

The ingress object 125 is a Kubernetes object that defines external access to the Kubernetes cluster 105. The ingress object 125 exposes routes to services within the cluster (e.g., the first service in the service chain 135) and can define how load balancing should be performed. As noted, the ingress controller 120 is responsible for translating this ingress object into configuration data to provide to the front-end load balancer controller 115.

The scaler module 130, in some embodiments, also operates on one or more Pods within the Kubernetes cluster 105. The scaler module 130 is responsible for (i) computing the scaling factors for each service in the service chain 135 and (ii) initiating pre-emptive auto-scaling of the services based on these computed scaling factors, traffic measurements from the front-end load balancer controller 115, and data indicating the processing capabilities of each service. The scaling factors for each respective service, as mentioned, estimates the percentage of the traffic received at the front-end load balancer (and thus received at the first service in the service chain) that will be subsequently received at the respective service. Depending on whether input coefficients to the scaling factor computation use user-defined or real-world observation data, the scaling factors can either be computed once (at initial setup of the cluster) or on a regular basis. The pre-emptive auto-scaling decisions output by the scaler module 130 specify, in some embodiments, when the number of Pods should be increased or decreased for a given service in the service chain. The operation of the scaler module 130 is described in additional detail below by reference to FIG. 2.

The service chain 135 is a set of services deployed in a specific topology. In the Kubernetes context of some embodiments, each of these services is implemented as a "micro-service" and is deployed as a set of one or more Pods. However, it should be understood that in other embodiments the service chain may be implemented as a set of virtual machines (VMs) or other data compute nodes (DCNs) rather than as Pods in a Kubernetes cluster. In this case, a front-end load balancer can still be configured to measure incoming traffic and provide this data to a scaler module (executing, e.g., on a different VM) that performs similar auto-scaling operations outside of the Kubernetes context.

In this example, the service chain 135 includes three services 140-150. The first service 140 receives traffic directly from the load balancer data plane 110 (potentially via Kubernetes ingress modules) and sends portions of this traffic (after performing processing) to both the second service 145 and the third service 150. The second service 145 also sends a portion of its traffic (after it has performed its processing) to the third service 150. The first service 140 is implemented using two Pods, the second service 145 is implemented using three Pods, and the third service 150 is implemented using a single Pod. Each Pod is allocated a particular amount of resources (e.g., memory and processing capability) that enable the Pod to perform its respective service on a particular number of requests in a given time period (e.g., requests/second). This per-Pod capacity can vary from one service to the next based on the physical resources allocated to each Pod for the service as well as the resources required to process an individual request by the service. In various embodiments, the services can include firewalls, forwarding elements (e.g., routers and/or switches), load balancers, VPN edges, intrusion detection and prevention services, logging functions, network address translation (NAT) functions, telecommunications network specific gateway functions, and other services, depending on the needs of the network.

Figure 2:
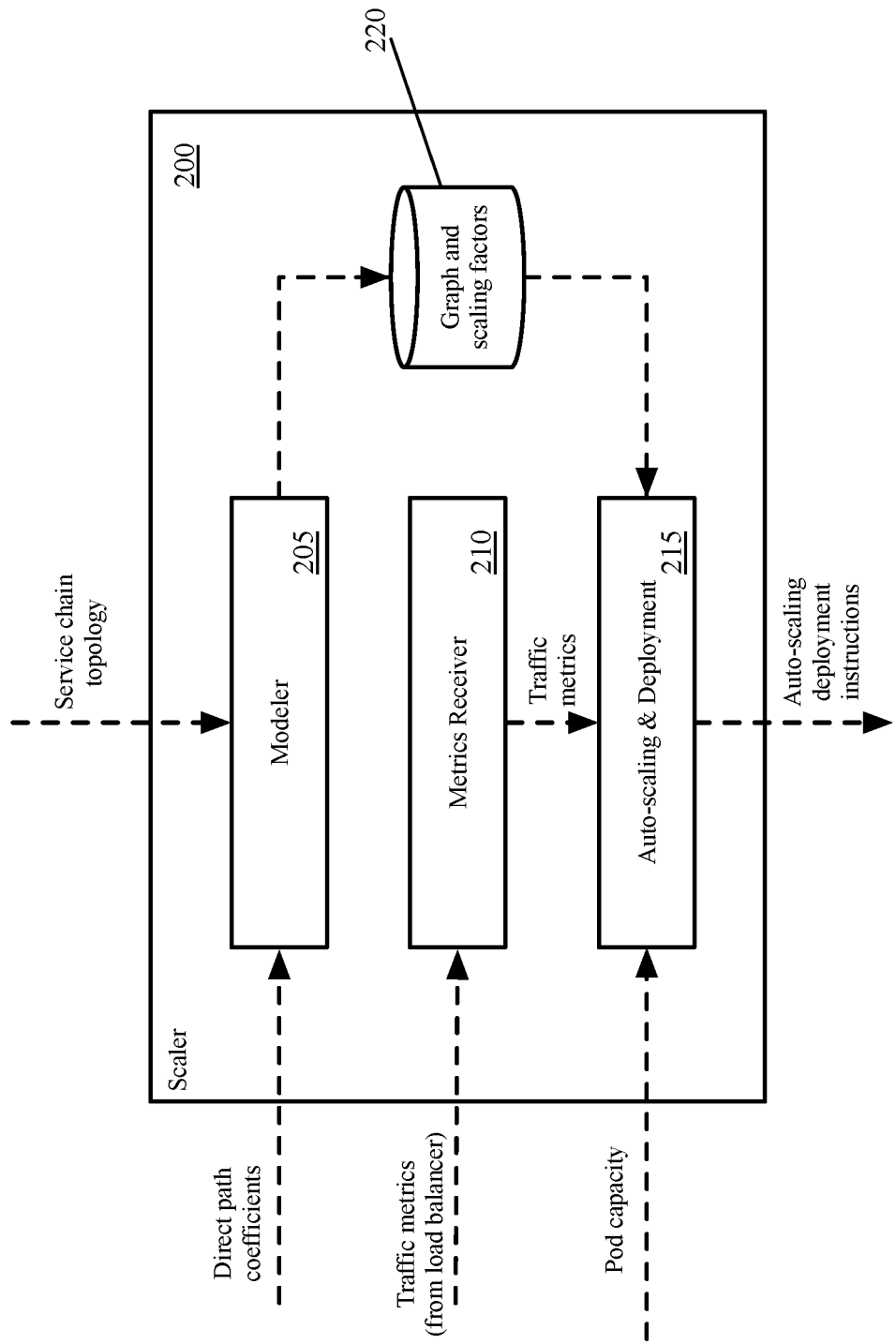
FIG. 2 conceptually illustrates the architecture of the scaler module of some embodiments.

FIG. 2 conceptually illustrates a more detailed view of the architecture of the scaler 200 of some embodiments (e.g., the scaler module 130). As shown, the scaler 200 includes a modeler 205, a metrics receiver 210, and an auto-scaling and deployment module 215. The modeler 205 receives the service chain topology as well as direct path coefficients and uses this information to (i) define a graph representing the service chain and (ii) compute the scaling factors for each of the services in the service chain (i.e., the scaling factors for estimating the percentage of traffic received at the first service that will be subsequently received at the other services). The modeler stores (e.g., in memory) the graph and scaling factors 220 for use by the auto-scaling and deployment module 215.

In some embodiments, the modeler 205 receives the service chain topology information from the services themselves or from other Kubernetes constructs. This topology indicates the direct paths between services in the service chain. The direct path coefficients specify, for each direct path in the service chain topology from a first service to a second service, the portion of traffic received at the first service that is forwarded on to the second service. For the example service chain 135 shown in FIG. 1, the paths from the first service 140 to the second service 145, from the first service 140 to the third service 150, and from the second service 145 to the third service 150 each have their own associated direct path coefficients. In different embodiments, the direct path coefficients may be administrator-specified or be based on recent observation of the service chain traffic. In the latter case, traffic information from the services in the service chain is provided to the modeler 205, which regularly determines the ratios of traffic forwarded from one service to the next. The operations of the modeler 205 to define the service chain graph and compute the scaling factors are described further below by reference to FIG. 3.

The metrics receiver 210 receives traffic metrics, including those indicating the amount of requests received at the first service in the service chain. In some embodiments, the metrics receiver 210 receives API schema information for the front-end load balancer from the ingress controller and uses this API information to retrieve the traffic metrics from the load balancer controller via API calls. The specific metrics received can include a total number of requests, requests per unit time (e.g., requests per second or millisecond), etc. As these metrics are retrieved, the metrics receiver 210 provides the metrics to the auto-scaling and deployment module 215.

The auto-scaling and deployment module 215 uses the scaling factors computed by the modeler 205 to determine, in real-time, whether any of the services in the service chain need to be scaled (e.g., either instantiation of additional Pods or removal of Pods) based on the traffic metrics. The capacity of each Pod is specified for each service (the capacity can vary between services) for one or more metrics (e.g., requests per unit time) and provided to the auto-scaling and deployment module 215 (e.g., as an administrator-provided variable or based on observation). The current value for this metric (as received from the load balancer controller and multiplied by the scaling factor for a given service) is divided by the Pod capacity for the service to determine the number of Pods that will be required for the service. If the actual number of Pods is less than the required number of Pods, then the auto-scaling and deployment module 215 manages the deployment of additional Pods for the service. In this manner, if a large increase in traffic is detected at the load balancer, all of the services can be scaled up to meet this demand prior to the receipt of all of those requests at the services. On the other hand, if the actual number of Pods deployed is greater than the required amount for the service, the auto-scaling and deployment module 215 manages the deletion of one or more Pods for the service. In different embodiments, the auto-scaling and deployment module 215 either handles the deployment/deletion operations directly or provides the necessary instructions to a Kubernetes control plane module that handles these operations for the cluster. The operations of the auto-scaling and deployment module 215 to predictively auto-scale the services of a service chain will be described in detail below by reference to FIG. 7.

Figure 3:
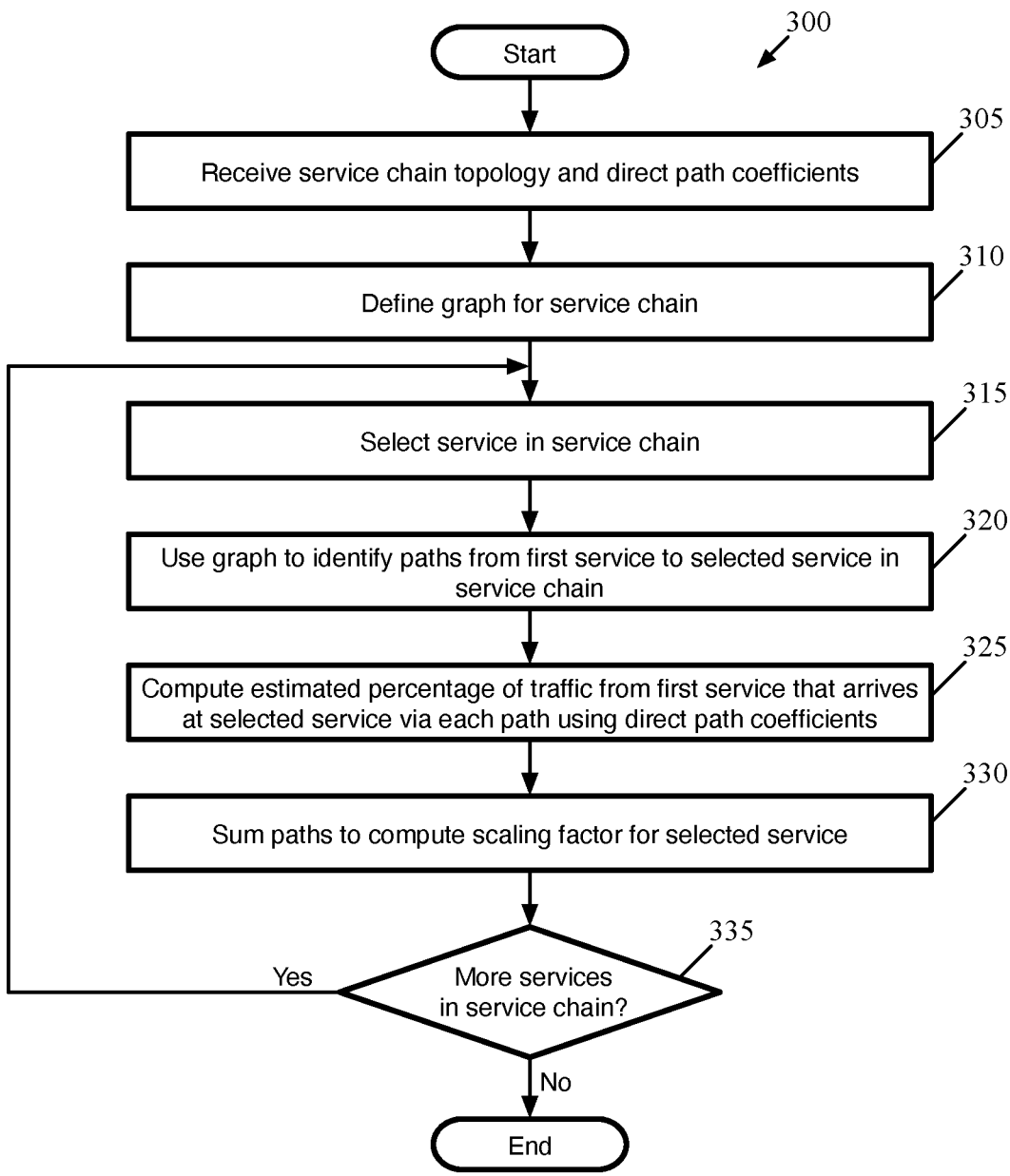
FIG. 3 conceptually illustrates a process of some embodiments for computing scaling factors for a set of services in a service chain.

FIG. 3 conceptually illustrates a process 300 of some embodiments for computing scaling factors for a set of services in a service chain. In some embodiments, the process 300 is performed by a scaler module (e.g., the modeler 205 of the scaler module 200 shown in FIG. 2). In different embodiments, this process 300 (or a similar process) may be performed once at initial configuration of the service chain or at regular intervals (if the direct path coefficients change over time). The process 300 will be described by reference to FIGS. 4 and 5, which illustrate an example of the calculation of scaling factors for a service chain.

As shown, the process 300 begins by receiving (at 305) a service chain topology and a set of direct path coefficients. The service chain topology indicates which services forward traffic directly to other services (i.e., indicates direct paths between services in the service chain). As noted above, the service chain topology information can be received from the services themselves or from other Kubernetes constructs. The direct path coefficients specify, for each direct path in the service chain topology from a first service to a second service, the portion of traffic received at the first service that is forwarded on to the second service. In different embodiments, the direct path coefficients may be administrator-specified or be based on recent observation of the service chain traffic. In the latter case, traffic information from the services in the service chain is provided to the scaler, which regularly determines the ratios of traffic forwarded from one service to the next (e.g., on an hourly basis based on the past hour of traffic).

The service chain topology, in some embodiments, is user-specified information that defines connections between services. Specifically, in the Kubernetes context, the service chain topology (referred to as NetworkServiceTopology) is a cluster-scoped construct capable of chaining services from different namespaces together in the cluster, thereby allowing service administrators to operate in their own namespaces while handing the job of service chaining to the infrastructure administrator. The following provides an example declaration for a connection between a first service (serviceA) in red namespace and a second service (serviceB) in blue namespace, with a direct path coefficient of 0.7:

kind: NetworkServiceTopology
metadata:
name: conn-svcA-svcB
spec:
sourceVertex: red/serviceA
destinationVertex: blue/serviceB
edgeWeight: 0.7

Next, the process 300 defines (at 310) a graph for the service chain. Specifically, some embodiments define a directed acyclic graph (DAG) based on the service chain topology (e.g., based on each user-specified connection). In this graph, each service is represented as a node and each direct path from one service to another is represented as an edge. Each edge from a first node to a second node has an associated coefficient (i.e., the direct path coefficient for the connection represented by that edge) that specifies an estimate of the percentage of requests received at the service represented by the first node that are forwarded to the service represented by the second node (as opposed to being dropped, blocked, or forwarded to a different service).

Figure 4:
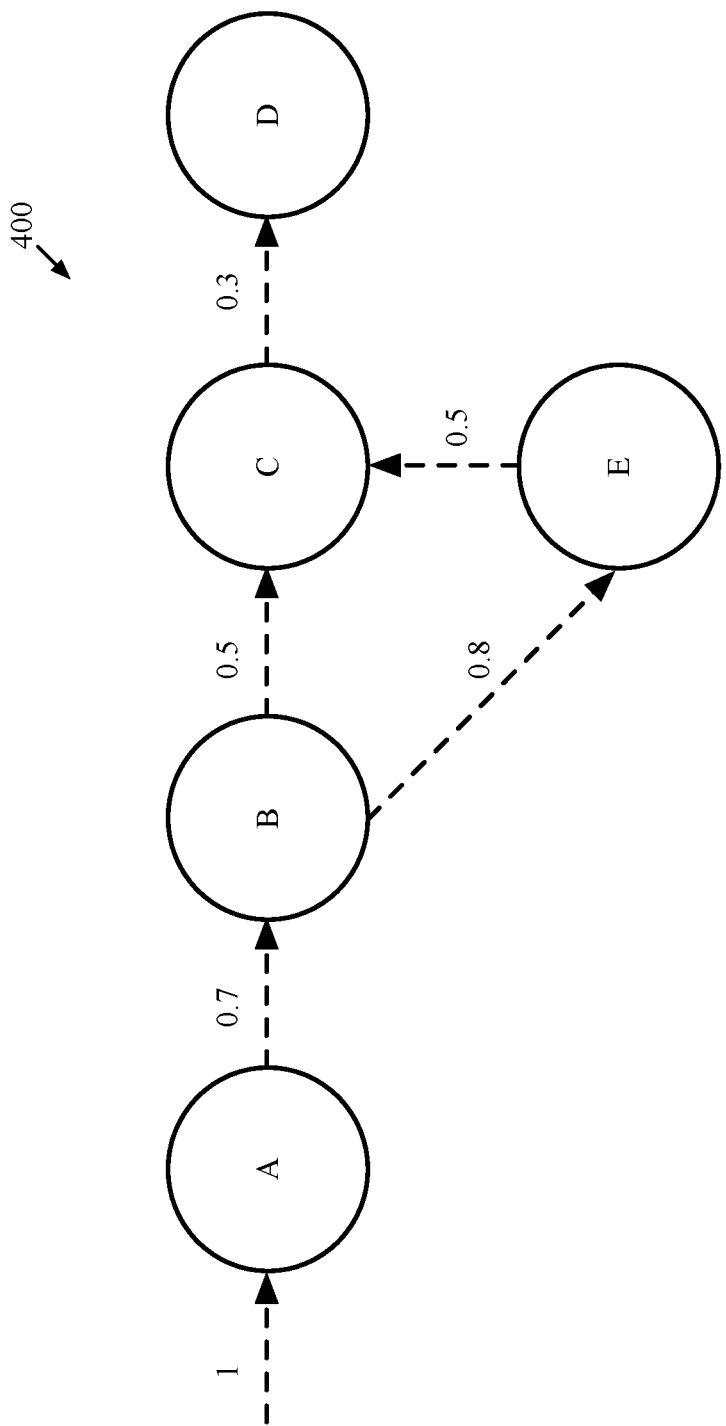
FIG. 4 conceptually illustrates an example of a directed acyclic graph for a service chain that includes five services.

FIG. 4 conceptually illustrates an example of a DAG 400 for a service chain that includes five services. Each service (A-E) is represented by a node in the DAG 400, with each of the edges having an associated direct path coefficient. As shown, service A is expected to forward 70% of its traffic to service B, which is expected to forward 50% of its traffic to service C and 80% of its traffic to service E (meaning that service B is expected to forward at least some of its traffic to both services). Service E is expected, in turn, to forward 50% of its traffic to service C, which is expected to forward only 30% of its traffic to service D.

With the graph defined, the process generates scaling factors for each of the services in the service chain. Different embodiments use different specific calculations to compute these scaling factors, though they reduce to the same computation. For instance, some embodiments traverse through the graph starting from the beginning of the service chain and compute scaling factors for nodes that build on the computations for previous nodes in the graph. Other embodiments, as in the process 300, compute the scaling factor for each service separately.

As shown, the process 300 selects (at 315) a service in the service chain. In some embodiments, the process 300 begins with the first node in the directed graph and then proceeds to select nodes using a breadth-first traversal of the graph. Other embodiments select the nodes randomly. However, embodiments that compute the scaling factors for later services in the chain by building on previous computations cannot use a random selection.

The process 300 uses (at 320) the graph to identify paths from the first service in the service chain to the selected service in the service chain. Assuming a single ingress point for the service chain, when the first service is selected, there is no path discovery required (and no scaling factor computation needed, as the scaling factor is always equal to 1). In the example graph 400 shown in FIG. 4, Service B has a single path (from service A). Service C, on the other hand has two paths (one from Service A to Service B to Service C and another from Service A to Service B to Service E to Service C). Service E only has a single path (Service A to Service B to Service E), while Service D also has two paths (one from Service A to Service B to Service C to Service D and another from Service A to Service B to Service E to Service C to Service D).

It should be noted that the example graph shown in FIG. 4 includes a single ingress node (Service A) and a single egress node (Service D, which does not forward traffic to any other service). However, other service chains may have other structures. In the case of multiple ingress services, the process 300 (or other processes) can be expanded to accommodate these multiple entry points to the graph. The scaling factors for the ingress services will depend on whether the front-end load balancer provides traffic metrics indicating the number of requests forwarded to each different ingress service (in which case the scaling factors are all equal to 1) or the total number of services provided to the service chain as a whole (in which case each ingress service has its own scaling factor). In addition, in the former case, scaling factors relative to each ingress service are calculated for each service in the service chain and in real-time the number of requests predicted for each service is a weighted sum over the requests being provided to each ingress service. Multiple egress services do not require a change to the computations of the scaling factors in some embodiments.

Next, for the selected service, the process 300 computes (at 325) an estimated percentage of the traffic received at the first service that arrives at the selected service via each path by using the direct path coefficients. The process 300 then sums (at 330) these percentages from the various different paths to the selected service in order to compute the scaling factor for the selected service. For a single path, the estimated percentage of traffic is computed by multiplying all of the direct path coefficients along that path.

FIG. 5 conceptually illustrates a table 500 showing these computations for each of the services shown in the graph 400 (relative to x, the ingress traffic). For Service A (the ingress service), the scaling factor is simply equal to 1. For Service B, there is only a single path represented by a single graph edge having a coefficient of 0.7, so the scaling factor of 0.7 is arrived at by simply using this single coefficient. The computation for Service C is more complicated. For Service C, two paths are identified; each of these includes the path from Service A to Service B, so the 0.7 coefficient can be factored out of the computation. The path from Service B to Service C has a coefficient of 0.5 while the path from Service B to Service E to Service C has a coefficient of 0.5 multiplied by 0.8. This results in a scaling factor of 0.63 for Service C, as shown in the graph. Service D is simply the scaling factor for Service C multiplied by the coefficient 0.3 for the path from Service C to Service D, equal to 0.189. Finally, there is a single path to reach Service E and the multiplication of the coefficients 0.7 and 0.8 results in a scaling factor of 0.56.

In the above example, all of the scaling factors are less than 1, as is common. However, in certain cases, a service may actually receive more traffic than the front-end load balancer if multiple different paths exist to the service. For instance, a logging application might receive log data from most or all applications in a cluster such that it receives multiple times the traffic that enters the cluster.

Returning to FIG. 3, after computing the scaling factor for the selected service, the process 300 determines (at 335) whether more services remain in the service chain. If this is the case, the process returns to 315 to select the next service. On the other hand, once all of the scaling factors have been computed, the process 300 ends. It should be understood that the process 300 is a conceptual process. Not only might the scaling factor computations be computed slightly differently but some embodiments compute all or some of the scaling factors in parallel rather than using the serial process shown in the figure.

As mentioned, some embodiments use slightly different processes to compute the scaling factors based on the directed acyclic graph for the service chain. Specifically, for the following algorithm, the inputs are a DAG represented with an adjacency list (DG), a coefficient for each directed edge in the graph, and a starting point in the graph (S). The following pseudocode describes the algorithm:

```
BuildIncomingEdgeGraph(DG AdjacencyList)
    (IE Incoming Edges):
    for K in DG.keys( ):
        NodeList := DG(K)
        for N in NodeList:
            if N not in IE.keys( ):
                append (IE(N), K)
    return IE
ModifiedBFS (DG AdjacencyList, S Node):
    IE = BuildIncomingEdgeGraph (DG)
    ScaleFactor(S) = 1
    Queue Q
    Enqueue(Q, S)
    while Q is not empty:
        V = Dequeue(Q)
        for N in DG(V):
            ScaleFactor(N) = ScaleFactor(N) + Weight(V,N)
            delete(IE(N), V)
            if IE(N) is empty:
                Enqueue (Queue, N)
```

In the above, the first step of the ModifiedBFS algorithm is to define the incoming edge graph (IE) for a node. The incoming edge graph for a particular node represents all the nodes that have an edge to that particular node. For example, in the graph 500 shown in FIG. 5, IE(B)==[A]. To compute the IE for a node, the algorithm traverses through the keys of the adjacency list DG and finds out the next set of vertices for a key. For each node N, it appends the key in IE(N) list.

Once the IE map is computed for all of the nodes, the start node S is added to a queue and a modified version of breadth first search is performed. For a node in the queue, first the node is dequeued in V. After this, the neighbors of V are fetched. For each neighbor, its scaling factor is calculated and its incoming edge from V to N is deleted. Once no other incoming edges to N are found, N is enqueue to the queue. This ensures that nodes are not enqueued unless all of the incoming edges to that node are exhausted, because the scaling factor is only complete if all of the incoming edges are visited.

As described above, the scaling factors may be computed once or on a regular basis, depending on whether the direct path coefficients are fixed or the scaler receives statistics with which to determine those coefficients. In the latter case, the direct path coefficients are calculated dynamically in some embodiments, either because the user does not have the information to set these values or because the values are not constant and change over time. Such a heuristics-based approach allows for more accurate auto-scaling calculations, especially when these values change over time.

For input into the dynamic calculations, some embodiments use traffic metrics from the services. This information may be retrieved from the services themselves or from load balancers interposed between the services in a service chain. Some embodiments send traffic to the front-end load balancer for inter-service load balancing while other embodiments use other load balancers to handle traffic between one service and the next. The following pseudocode for an algorithm CalculateEdgeWeight uses the following variables: FS(e, t) represents flow data for a period of time on a given direct path, time range (TR) is the period of time over which a sliding window average is calculated, total flow (TF) is the sum of all incoming flow data for a node (e.g., a service or other application) in the given time range TR, and average flow (AvgF) is the average value of the incoming flow data for a node, which is obtained by dividing the total flow TF by the time range TR.

```
Initial condition for all edges: TF←0
CalculateEdgeWeight (Flow, G, TF) (AvgF):
    for all edges e in graph G(V,E):
        FS(e, t) ← Flow(e)
        TF(e) ← TF(e) + FS(e, t)
        if t > TR:
            TF(e) ← TF(e) – FS(e, t-TR)
        AvgF(e) ← TF(e)/TR
    return AvgF
```

The above algorithm determines the value of the average flow over a time period using a sliding window method to determine the direct path coefficient for an edge in the graph. An array Flow at time t stores the flow data for all of the edges and is stored in FlowStore (FS). To calculate the average weight, the algorithm finds the total flow (TF) for an edge by adding all of the flows for the edge from the current time t to (t-TR). At later times, the total flow for an edge is calculated by adding the latest flow for the edge and subtracting the value of the flow at the time t-TR. The average flow for an edge is calculated by dividing the total flow for the edge by the time range.

FIG. 6 conceptually illustrates a table 600 providing an example of flow data for a particular path between two applications. In this example, data points are retrieved for every 12 minutes, and a time range value of 5 provides a one-hour time period. This allows, at 9:48, the total flow to be calculated as 540 (100+110+120+90+120) for an average flow value of 108. At 10:00, the new flow value to add is 60 and so the total flow is equal to 500 (540−100+60), for an average flow value of 100. These flow values can then be used to calculate the direct path coefficient (i.e., by identifying what percentage of traffic sent to a particular service is forwarded to the next service in the service chain), and subsequently to calculate the scaling factors.

With the scaling factors determined, the scaler module determines in real-time whether each of the services needs to be scaled. Based on the traffic being received at the first service in the service chain (from the load balancer), some embodiments calculate the traffic expected at each service and determine whether the current deployment for that service has the capacity required to handle that traffic without dropping traffic or imposing longer latency. If the expected traffic is larger than current capacity for a given service, the scaler initiates deployment of additional instances (e.g., additional Pods) for that service.

Figure 7:
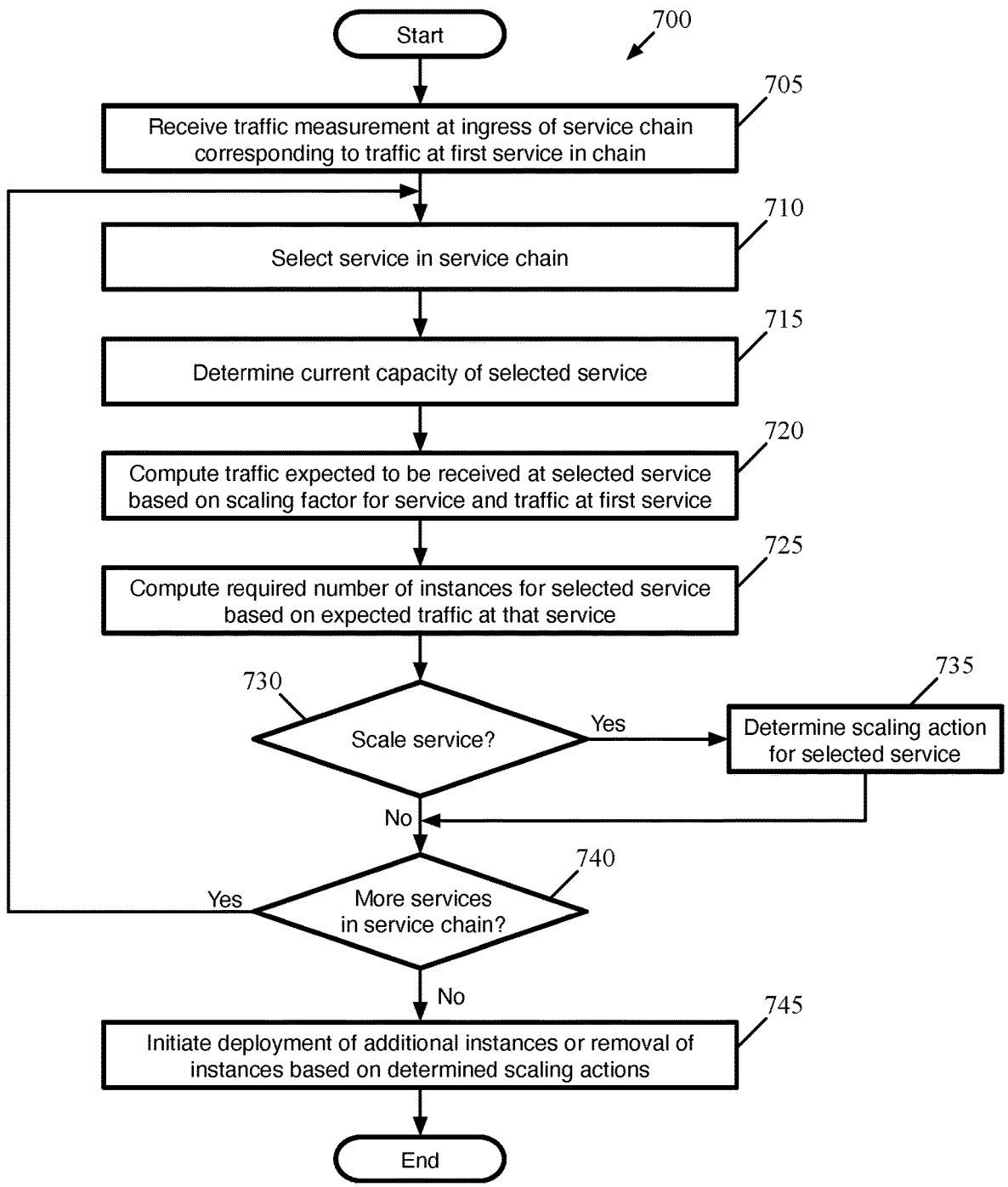
FIG. 7 conceptually illustrates a process of some embodiments for determining whether scaling of services in a service chain is required based on traffic expected to arrive at those services and initiating that scaling if needed.

FIG. 7 conceptually illustrates a process 700 of some embodiments for determining whether scaling of services in a service chain is required based on traffic expected to arrive at those services and initiating that scaling if needed. In some embodiments, the process 700 is performed by a scaler module (e.g., the auto-scaling and deployment module 215 of the scaler shown in FIG. 2). In some embodiments, the process 700 is performed at regular intervals or as metrics are retrieved from the front-end load balancer. The process 700 will be described by reference to FIGS. 8-12, which illustrate examples of scaling the services in a service chain.

Figure 8:
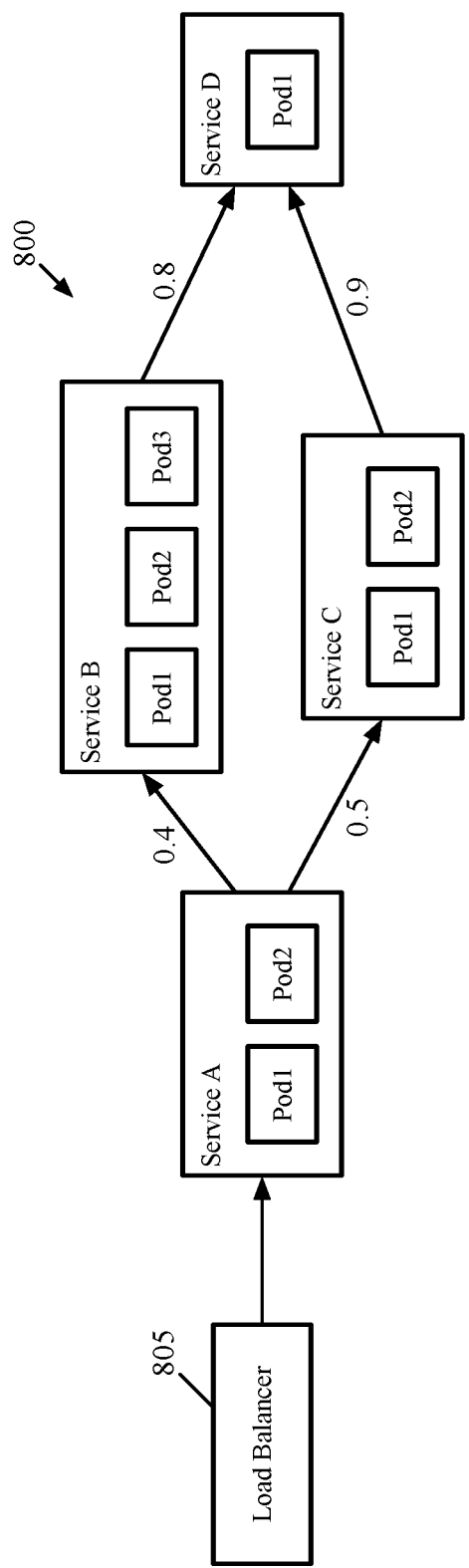
FIG. 8 conceptually illustrates an example of a service chain as deployed.

Specifically, FIG. 8 conceptually illustrates an example of a service chain 800 as deployed. The service chain 800 includes a first service (A) for which two Pods are instantiated, a second service (B) for which three Pods are instantiated, a third service (C) for which two Pods are deployed, and a fourth service (D) for which a single Pod is deployed. This figure also shows the direct path coefficients for each of the connections in the service chain 800. Service A receives data messages directly from the front-end load balancer 805 then forwards 40% of its traffic to Service B and 50% of its traffic to Service C. Service B sends 80% of its traffic to Service D and Service C sends 90% of its traffic to Service D.

As shown, the process 700 begins by receiving (at 705) traffic measurements at the ingress of a service chain, corresponding to the traffic at the first service in the service chain. As described, the front-end load balancer of some embodiments generates these metrics, which are retrievable by the scaler module (e.g., using API calls in the load balancer schema). The received metrics provide a measure of incoming traffic to the first service. This may be measured in an absolute number of requests, a rate of requests (e.g., requests per second), a latency measure (which can be assumed to scale linearly with the request rate, or other metrics.

The scaler is then able to use these received metrics to scale each of the services in the service chain. The scaler determines, for each service, the expected traffic to reach that service (based on the scaling factor) and whether the current deployment for the service will have adequate capacity to handle that expected traffic. If the current deployment is inadequate, the scaler initiates deployment of one or more additional instances; if the current deployment should be reduced, the scaler initiates deletion of one or more existing instances.

Figure 9:
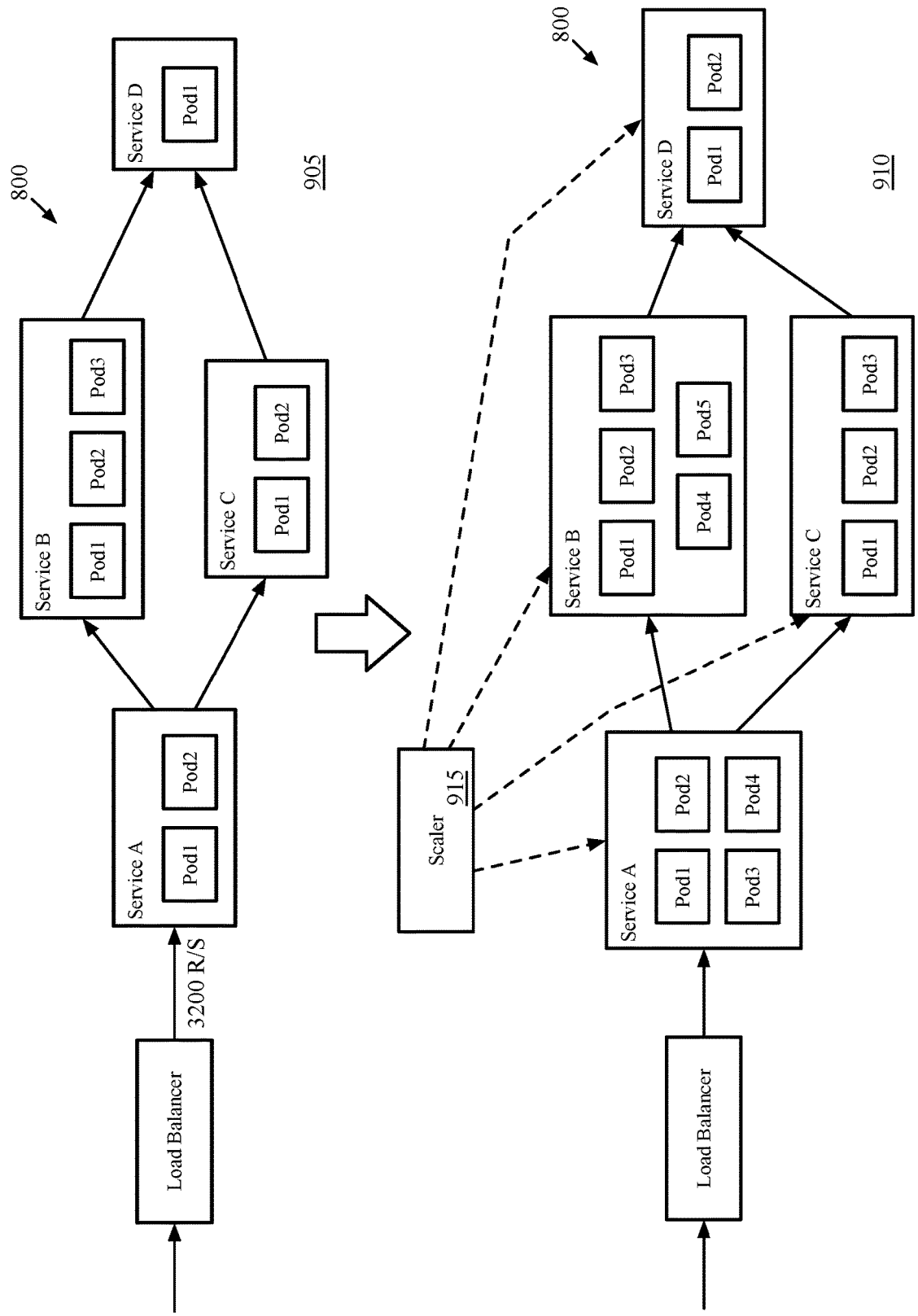
FIG. 9 conceptually illustrates scaling up the deployment of the service chain of FIG. 8 in response to receiving a first traffic measurement.

FIG. 9 conceptually illustrates scaling the deployment of the service chain 800 over two stages 905-910 in response to receiving a first traffic measurement. The first stage 905 of FIG. 9 shows the service chain 800 as deployed in FIG.

8, while the second stage 910 shows this service chain 800 after being scaled up in response to the traffic measurement.

Figure 10:
FIG. 10 illustrates a table showing the computations to arrive at the scaling decisions for the example shown in FIG. 9.

FIG. 10 illustrates a table 1000 showing the computations to arrive at the scaling decisions for the example shown in FIG. 9. As shown, each of the services in the service chain 800 has an associated scaling factor (1 for Service A, 0.4 for Service B, 0.5 for Service C, and 0.77 for Service D) computed as described above based on the direct path coefficients shown in FIG. 8.

Returning to FIG. 7, the process 700 selects (at 710) a service in the service chain. Some embodiments select the services by traversing the graph of the service chain topology (as with the scaling factor calculation), while other embodiments select services using different techniques (e.g., randomly). It should be noted that the process 700 is a conceptual process and other processes might perform slightly different operations or perform the operations in a different order. For instance, although the process 700 shows each service being evaluated serially, other embodiments might evaluate whether to scale each of the services in parallel.

The process 700 then determines (at 715) the current capacity of the selected service. In some embodiments, each service has a different capacity per instance (e.g., per Pod). This capacity may vary based on (i) the physical resources allocated to each instance for the service and (ii) the type of processing performed by the service. In some embodiments, different administrators for the different services set their own configurations for the physical resources allocated to each Pod, which may vary from service to service as a result. In addition, different types of data message processing can require different amounts of memory and/or processing power. For instance, a service that performs layer 7 processing (e.g., a deep packet inspection service) might require more resources per data message than a service that only performs layer 2 or layer 3 processing (e.g., an L2/L3 firewall service). Typically, the current capacity for a given service is the per-instance capacity multiplied by the currently-deployed number of instances.

In the example of FIG. 10, each of the services has a different per-Pod capacity. Each Pod for Service A can handle 1000 requests/second, each Pod for Service B can handle 300 requests/second, each Pod for Service C can handle 600 requests/second, and each Pod for Service D can handle 1250 requests/second. Given the current deployment, Service A can handle 2000 requests/second, Service B can handle 900 requests/second, Service C can handle 1200 requests/second, and Service D can handle 1250 requests/second.

Next, the process 700 computes (at 720) the traffic expected to be received at the selected service based on the scaling factor for the service and the traffic at the first service. Some embodiments compute this expected traffic for the service by simply multiplying the traffic seen at the first service (i.e., from the front-end load balancer) by the scaling factor for the service. As shown in FIG. 10, the first service (Service A) is expected to receive 3200 requests/second, the traffic flow retrieved from the load balancer. Service B is expected to receive 1280 requests/second (multiplying 3200 by the scaling factor of 0.4), Service C is expected to receive 1600 requests/second (multiplying 3200 by the scaling factor of 0.5), and Service D is expected to receive 2464 requests/second (multiplying 3200 by the scaling factor of 0.77).

Based on the per-instance capacity and the expected traffic for the selected service, the process 700 computes (at 725) the required number of instances for that service. This value can be computed by dividing the expected traffic by the per-instance capacity and applying the ceiling function that rounds a decimal value up to the next integer (i.e., 3.1 and 3.9 are both rounded to 4). Some embodiments also add a safety factor to the value before applying the ceiling function (e.g., adding 0.1 so that 2.95 becomes 3.05, which rounds to 4) in case the traffic to a service increases more than expected (e.g., based on more traffic than expected being forwarded by one or more of the services in the chain).

In the example shown in FIG. 10, the expected traffic for Service A is 3200 requests/second, which requires 4 Pods when divided by the per-Pod capacity of 1000 requests/second (with 3.2 rounding up to 4). The expected traffic for Service B is 1280 requests/second, which requires 5 Pods when divided by the per-Pod capacity of 300 requests/second (with 4.27 rounding up to 5). The expected traffic for Service C is 1600 requests/second, which requires 3 Pods when divided by the per-Pod capacity of 600 requests/second (with 2.67 rounding up to 3). Lastly, the expected traffic for Service D is 2464 requests/second, which requires 2 Pods when divided by the per-Pod capacity of 1250 requests/second (with 1.97 rounding up to 2). However, if a small safety factor were applied, 3 Pods would be required for Service D.

The process 700 then determines (at 730) whether to scale the selected service. If the service should be scaled, the process determines (at 735) the scaling action for the selected service. As discussed, some embodiments scale the services predictively so that the additional instances are deployed prior to the existing instances for the service being overloaded by the incoming traffic. In the example, shown in the table 1000 of FIG. 10, Services A and B should be scaled by adding 2 Pods for each service while Services C and D should be scaled by adding 1 Pod for each service. Owing to (1) the different per-instance capacity of different applications (in this case, the services) and (2) the different expected traffic flow reaching each different applications based on the computed scaling factors, in many cases different numbers of instances will be required due to the same change in ingress traffic.

Next, the process 700 determines (at 740) whether any more services in the service chain remain for evaluation. If additional services remain, the process 700 returns to 710 to select the next service and determine whether to scale that service. As mentioned, in some embodiments the various services are evaluated in parallel to determine whether to scale each of the services, rather than in a serial loop as shown in the figure.

Once all of the services have been evaluated, the process 700 initiates (at 745) deployment of additional instances or removal of instances based on the determined scaling actions (i.e., the actions determined at 735 for each service), then ends. In some embodiments, the scaler module itself modifies the deployment to change the number of instances for the different services. In the Kubernetes context, the scaler module edits one or more configuration objects that define the deployment to change the number of Pods implementing each service in some embodiments. In other embodiments, the scaler module provides the deployment edits to another component (e.g., an auto-scaling application in the Kubernetes control plane) that handles the modification to the deployment.

The second stage 910 of FIG. 9 shows that, as a result of the calculations made by the scaler module 915 (as shown in the table 1000), the scaler has modified the deployment of the service chain 800. Service A now has 4 Pods deployed, Service B now has 5 Pods deployed, Service C now has 3

Pods deployed, and Service D now has 2 Pods deployed. While the figure conceptually shows the scaler 915 directly modifying the services, as noted above in some embodiments the scaler either modifies configuration objects for the services directly or hands off the deployment to a separate component (e.g., an auto-scaling application) that modifies these configuration objects.

As noted, in addition to scaling up a set of applications (e.g., the services in a service chain, as shown in FIG. 9), in some embodiments the scaler module can also determine when to scale down one or more applications. That is, if the number of incoming requests drops, the scaler can perform similar calculations to determine that fewer instances of at least some of the applications are required. For scaling up due to increased traffic, the predictiveness helps avoid increases in latency and dropped packets. For scaling down, the predictiveness is not as crucial but can help free up resources more quickly when those resources are not needed for the current traffic levels.

Figure 11:
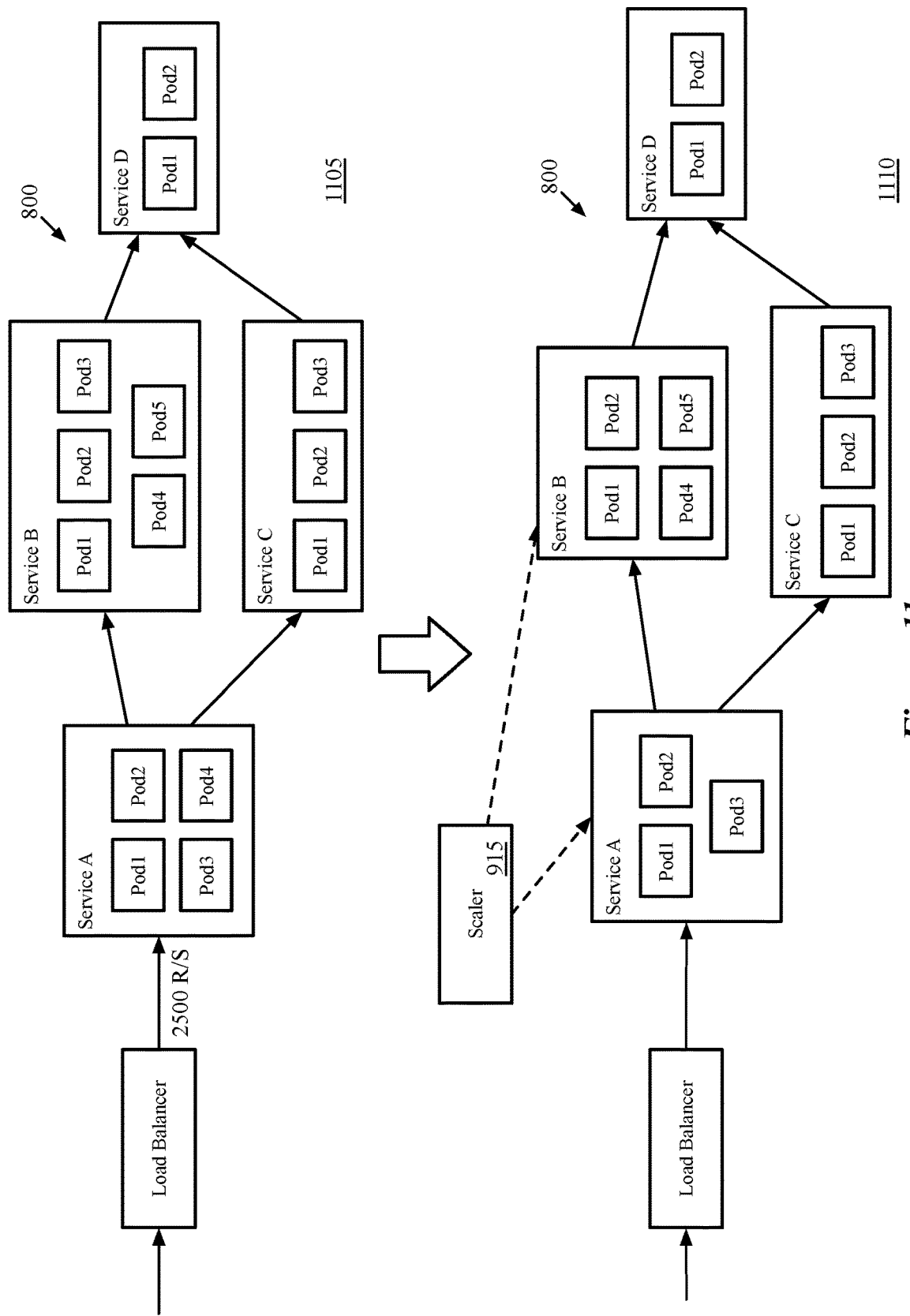
FIG. 11 conceptually illustrates scaling down the deployment of the service chain of FIG. 8 in response to receiving a second traffic measurement.

FIG. 11 conceptually illustrates scaling down the deployment of the service chain 800 over two stages 1105-1110 in response to receiving a second traffic measurement. The first stage 1105 of FIG. 11 shows the service chain 800 as deployed in the second stage 910 of FIG. 9, while the second stage 1110 shows this service chain 800 after some of the services have been scaled down in response to the second traffic measurement.

Figure 12:
FIG. 12 illustrates a table showing the computations to arrive at the scaling decisions for the example shown in FIG. 11.

FIG. 12 illustrates a table 1200 showing the computations to arrive at the scaling decisions for the example shown in FIG. 11. The scaling factors and per-Pod capacity for these services are the same as shown in the table 1000 of FIG. 10. In this case, Service A is expected to receive 2500 requests/second (the traffic flow retrieved from the load balancer), a drop in traffic as compared to the measurement shown in FIG. 10 that caused all of the services to be scaled up. Service B is expected to receive 1000 requests/second (multiplying 2500 by the scaling factor of 0.4), Service C is expected to receive 1250 requests/second (multiplying 2500 by the scaling factor of 0.5), and Service D is expected to receive 1925 requests/second (multiplying 2500 by the scaling factor of 0.77).

The expected traffic for Service A of 2500 requests/second requires 3 Pods when divided by the per-Pod capacity of 1000 requests/second (with 2.5 rounding up to 3). The expected traffic for Service B of 1000 requests/second requires 4 Pods when divided by the per-Pod capacity of 300 requests/second (with 3.33 rounding up to 4). The expected traffic for Service C of 1250 requests/second requires 3 Pods when divided by the per-Pod capacity of 600 requests/second (with 2.08 rounding up to 3). Lastly, the expected traffic for Service D of 1925 requests/second requires 2 Pods when divided by the per-Pod capacity of 1250 requests/second (with 1.54 rounding up to 2).

As a result of these calculations, the scaler 915 determines that one Pod should be removed from the deployments of Services A and B, but the deployments of Services C and D do not require updating. As such, the second stage 1110 of FIG. 11 shows that, as a result of the calculations made by the scaler module 915 (as shown in the table 1200), the scaler 915 has modified the deployment of the service chain 800. Service A now has only 3 Pods deployed, Service B now has 4 Pods deployed, while Service C and Service D are unchanged.

FIG. 13 conceptually illustrates an electronic system 1300 with which some embodiments of the invention are implemented. The electronic system 1300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieve instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash drive, etc.) as the permanent storage device. Like the permanent storage device 1335, the system memory 1325 is a read-and-write memory device. However, unlike storage device 1335, the system memory is a volatile read-and-write memory, such a random-access memory. The system memory stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieve instructions to execute and data to process in order to execute the processes of some embodiments.

The bus 1305 also connects to the input and output devices 1340 and 1345. The input devices enable the user to communicate information and select commands to the electronic system. The input devices 1340 include alphanumeric keyboards and pointing devices (also called "cursor control devices"). The output devices 1345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 3 and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method comprising:
at an application scaler that executes on a first Pod in a Kubernetes cluster:
from a front-end load balancer that operates outside of the cluster to process incoming requests to the cluster, identifying a first number of requests received at a first application in a chain of applications executing on Pods in the cluster to process the incoming requests;
based on the first number of requests received at the first application, determining that a second application that processes at least a subset of the requests after processing by the first application in the chain of applications requires additional resources to handle a second number of requests that will be received at the second application; and
increasing the amount of resources available to the second application prior to the second application receiving the second number of requests by increasing a number of Pods in the cluster that execute the second application.

2. The method of claim 1, wherein the front-end load balancer receives the requests and provides the requests to the first application.

3. The method of claim 2, wherein the front-end load balancer comprises (i) one or more data plane load balancer engines that receive the requests as data messages and forward the data messages to instances of the first application and (ii) a load balancer controller that receives information about the data messages from the data plane load balancers to measure the first number of requests.

4. The method of claim 1, wherein identifying the first number of requests comprises receiving analytics data from the front-end load balancer specifying the number of requests received.

5. The method of claim 1, wherein each application in the chain of applications, including the first and second applications, comprises one or more instances, each instance implemented by one or more Pods in the cluster.

6. The method of claim 5, wherein each Pod implementing an instance of the second application is allocated a particular amount of physical resources capable of handling a particular number of requests in a particular amount of time.

7. The method of claim 5, wherein increasing the amount of resources further comprises allocating additional physical resources to one or more of the instances of the second application.

8. The method of claim 1, wherein the application scaler is a separate application implemented in the Kubernetes cluster that does not receive or process the requests.

9. The method of claim 1, wherein:
the chain of applications is an ordered series of applications; and
a particular percentage of requests received at the first application are passed through the ordered series of applications to the second application.

10. The method of claim 9, wherein the ordered series of applications comprises at least a third application that processes the requests between the first application and the second application.

11. The method of claim 1, wherein a second Pod that implements the first application performs a first service for a particular request and forwards the request through a network of the Kubernetes cluster to a third Pod that implements the second application for the third Pod to perform a second service for the particular request.

12. A non-transitory machine-readable medium storing an application scaler program for execution by at least one processing unit, the application scaler program executing in a Kubernetes cluster and comprising sets of instructions for:
from a front-end load balancer that operates outside of the cluster to process incoming requests to the cluster, identifying a first number of requests received at a first application in a chain of applications executing on Pods in the cluster to process the incoming requests;
based on the first number of requests received at the first application, determining that a second application that processes at least a subset of the requests after processing by the first application in the chain of applications requires additional resources to handle a second number of requests that will be received at the second application; and
increasing the amount of resources available to the second application prior to the second application receiving the second number of requests by increasing a number of Pods in the cluster that execute the second application.

13. The non-transitory machine-readable medium of claim 12, wherein the front-end load balancer receives the requests and provides the requests to the first application.

14. The non-transitory machine-readable medium of claim 13, wherein the front-end load balancer comprises (i) one or more data plane load balancer engines that receive the requests as data messages and forward the data messages to instances of the first application and (ii) a load balancer controller that receives information about the data messages from the data plane load balancers to measure the first number of requests.

15. The non-transitory machine-readable medium of claim 12, wherein the set of instructions for identifying the first number of requests comprises a set of instructions for receiving analytics data from the front-end load balancer specifying the number of requests received.

16. The non-transitory machine-readable medium of claim 12, wherein each application, including the first and second applications, comprises one or more instances, each instance implemented by one or more Pods in the cluster.

17. The non-transitory machine-readable medium of claim 16, wherein each Pod implementing an instance of the second application is allocated a particular amount of physical resources capable of handling a particular number of requests in a particular amount of time.

18. The non-transitory machine-readable medium of claim 12, wherein the application scaler program does not receive or process the requests.

19. The non-transitory machine-readable medium of claim 12, wherein:
each application in the chain of applications, including the first and second applications, comprises one or more instances, each instance implemented by a Pod in the cluster; and
the set of instructions for increasing the amount of resources further comprises a set of instructions for allocating additional physical resources to one or more instances of the second application.

20. The non-transitory machine-readable medium of claim 12, wherein:
the chain of applications is an ordered series of applications;
a particular percentage of requests received at the first application are passed through the ordered series of applications to the second application; and
the ordered series of applications comprises at least a third application that processes the requests between the first application and the second application.

* * * * *